Sept. 8, 1964  O. K. HUNSAKER  3,147,828
BRAKE DRUM CONSTRUCTION
Filed Aug. 17, 1961
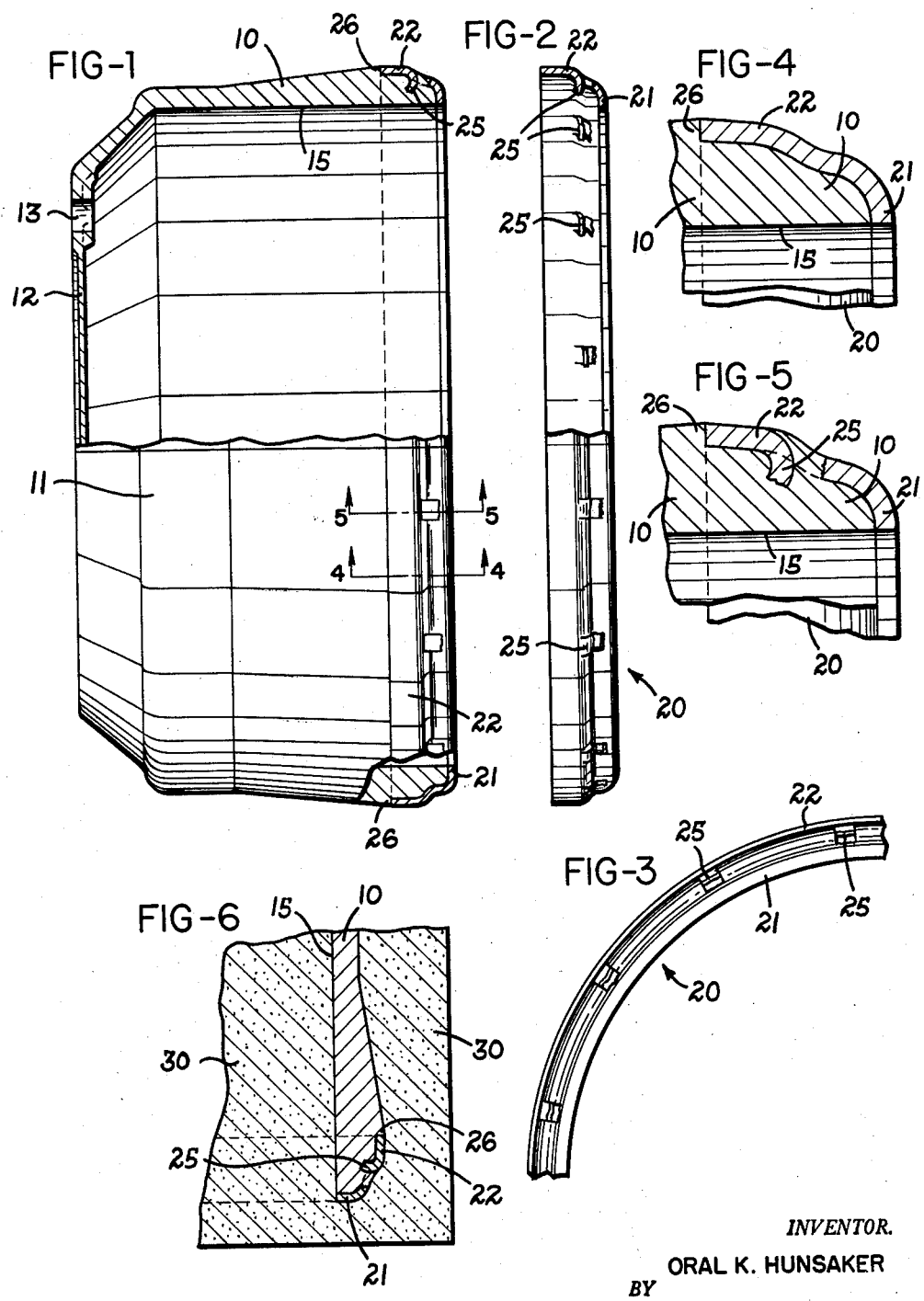
INVENTOR.
ORAL K. HUNSAKER
BY
Marechal, Biebel, French & Bugg
ATTORNEYS

United States Patent Office 3,147,828
Patented Sept. 8, 1964

3,147,828
BRAKE DRUM CONSTRUCTION
Oral K. Hunsaker, Kettering, Ohio, assignor to The Dayton Malleable Iron Company, Dayton, Ohio, a corporation of Ohio
Filed Aug. 17, 1961, Ser. No. 132,224
5 Claims. (Cl. 188—218)

This invention relates to automotive and heavy duty brake drums, such as used for large trucks, road building machinery, and the like, and, more particularly, to cast iron brake drums formed as a unitary casting and including an integrated reinforcing edge tension ring member over and around the outer peripheral edge of the open side of the brake drum.

As will be understood, substantial amounts of heat are generated by friction during the application of brakes on various automobiles and, particularly, with heavy trucks having air brakes and such power devices and with other large vehicles and self-propelled machinery. Similarly, tremendous forces are imposed upon truck brake drums as the brakes are applied and the brake shoes are forced outwardly against the drum. Indeed, it is quite possible or even usual for the brake drums on heavy trucks to be heated actually to red heat during application of the brakes and/or be warped or bent visibly out-of-round by the force of the brake shoes thereagainst.

It may be desired for achieving optimum operation or characteristics of such a truck brake drum to attempt to combine the characteristic of high tensile strength at relatively high temperature with rapid dissipation of friction-engendered heat. Thus, the inevitably intermittent use of brakes may suggest that very rapid heat dissipation is a principal advantage, yet the design of the wheel and hub structures of many, if not most, large trucks today includes the situation where the wheel and tire almost completely and closely overlies and encloses the brake drum and in a manner so as substantially to interrupt or baffle air flow over the outside of the drum which might be expected to aid in rapid dissipation of heat therefrom.

Accordingly, in the absence of optimum or desirable free air flow over the outer surface of the drum, it may be attempted to enhance the dependability and service life of brake drums by utilizing therefor stronger materials such as steel which may be expected to achieve the desired strength even in relatively thin sections, but such an arrangement may substantially increase the cost of the drum and to an extent which may be intolerable as a commercial expedient.

If it is attempted to utilize the better heat-dissipating qualities of a material such as cast iron, certain of the strength characteristics may have to be sacrificed with this material. Even if heavier cast iron sections are utilized in an attempt to achieve the desired strength, the brittleness of cast iron or the tendency of this material to crack (either from sharp mechanical blows or from repeated heated and cooling thermal shocks) may promote the formation of small cracks which engendered failure of the brake drum when extreme braking pressures are applied under conditions of high temperature.

According to this invention, however, a cast iron brake drum is provided and having relatively heavy sections of cast iron, to utilize as much as possible the heat dissipating characteristics of this material and to provide a large mass of metal as a heat sink or reservoir to absorb large quantities of heat before the temperature of the entire mass is raised to dangerous levels, and providing a steel tension ring as a reinforcing and protective member around and over peripheral edge portions of the cast iron drum as a strength-reinforcing band and to minimize the occurrence or proliferation of cracks in the cast iron, yet so arranged as not to interfere with heat dissipation from the drum; and, as a further feature of this invention, such steel protective and reinforcing edge strip or band is integrally locked and cast into and over the cast iron brake drum and at the same time as the brake drum itself is cast.

One object of this invention is to provide a brake drum of the character described substantially entirely made of cast iron and having an integrally cast and interlocked steel reinforcing and protecting edge band or cover around and over peripheral edge portions thereof for tension reinforcement of the brake drum and protection of the cast iron edges thereof against formation or proliferation of cracks.

Another object of this invention is to provide a brake drum of the character described having a relatively large mass of soft or brittle metal around the braking surfaces thereof to provide a capacious heat sink or reservoir for absorbing and retaining substantial amounts of friction-engendered heat before the temperature of the entire cast iron drum rises sufficiently into a temperature range of dangerously decreased mechanical strength, and also having a tension edge reinforcement around the peripheral edge portion of the drum for resisting substantial deformation of the cast iron under braking pressure and at elevated temperatures thereof.

A further object of this invention is to provide for the manufacture of a brake drum of the character described by the simple sand casting of substantially the entire drum from cast iron, and with an interlocked steel reinforcing and protective edge band over peripheral edge portions of the drum and integrally cast into the drum itself during the sand casting operation thereof.

Other objects and advantages of this invention will be apparent from the following description, the accompanying drawing, and the appended claims.

In the drawing:

FIG. 1 is a view partly in elevation and partly broken away in section of a brake drum construction embodying and for practicing this invention;

FIG. 2 is a view partly in elevation and partly broken away in section of the interlocked steel reinforcing band of FIG. 1 prior to casting of the brake drum construction;

FIG. 3 is a fragmentary view of the portion of the steel reinforcing band of FIG. 2 looking from the left of FIG. 2;

FIG. 4 is a fragmentary section on a larger scale along the line 4—4 of FIG. 1;

FIG. 5 is a fragmentary section on a larger scale along the line 5—5 of FIG. 1; and FIG. 6 is a fragmentary section showing a portion of the brake drum construction of FIG. 1 during the casting thereof and in the casting mold.

Referring to the drawing, in which like reference characters refer to like parts throughout the several views thereof, a brake drum construction embodying and for practicing this invention is illustrated in FIG. 1 as including a generally drum-shaped cylindrical body portion 10 of cast iron, with which is integrally cast and formed a conical flange portion 11 including a flat face 12 and a plurality of bolt holes 13 for affixing the drum to the inside of a truck hub or wheel in known manner and as well understood. The inside of drum portion 10 includes a cylindrical braking surface indicated at 15, against which the brake shoes are forced outwardly to provide braking action when desired.

Around and over the open peripheral edge of drum 10 is provided a continuous steel tension reinforcing and protecting ring 20, having, preferably, an inwardly extending edge flange 21 overlying the exposed thickness of the edge of cast iron drum 10 and a circumferential band portion 22 encircling the outer circumference of drum 10 and tightly fitting therearound in tension. At a substantial plurality of spaced points around ring 20 are punched inwardly curved hooks 25 for interlocking or embedding in the cast iron material of drum 10 to maintain ring 20 integrally affixed and positioned thereon, and the outer circumferential surface of drum 10 adjacent the circumferential tension band portion 22 of ring 20 preferably includes an outwardly inclined shoulder 26 abutting against the edge of ring 20 for forming a substantially continuous outer surface and additional interlocking engagement for affixing ring 20 integrally to drum 10.

As will be apparent from the foregoing, although drum 10, as well as the conical flange and mounting face portions 11 and 12 thereof, is substantially completely formed merely of sand cast iron, the open peripheral edge portion thereof (at the right of FIG. 1) is completely and protectively covered by edge flange 21 of steel ring 20 and in a manner to protect such cast iron edges from cracks which may be started or produced therein by mechanical blows in use or handling or, even, as a result of thermal shocks incident to repeated and rapid heating and cooling of the cast iron of drum 10. Additionally, tension band portion 22 of steel ring 20 surrounds the outer surface of drum 10 adjacent the open edge thereof and in tension so as to provide tension reinforcing of the drum resistant to either crack failure or other effects of extreme outward braking pressure applied against braking surface 15 of drum 10. Thus, there is provided a cast iron drum with an outer circumferential tension band for increasing the strength thereof and with the outer or peripheral edges most susceptible to cracks or damage protected by the overlying flange portions of ring 20, while the inclined shoulder 26 squarely meets and blends into the edge of tension band 22 of ring 20 to provide a cast iron section of increased thickness at the juncture between steel ring 20 and the surface of the cast iron portion of drum 10.

In addition to the foregoing measures for reinforcing the mechanical strength of the cast iron portions of drum 10 and protecting edges thereof from cracks, the construction of FIG. 1 also includes provision for accommodating increased amounts of friction-engendered heat. Thus, ring 20 is arranged so as to cover only a relatively small portion of the heat-dissipating surface around the outer circumference of drum 10, so as to interfere little or none with the normal heat dissipation from the outer surface of drum 10, as compared with, for example, a situation where substantially the entire outer surface of the cast iron portions were overlaid with a layer of steel material having, as well understood, slower or less advantageous heat dissipating properties than does cast iron. Additionally, the thickness or section of drum 10 is made relatively heavy, and without increasing the danger of either mechanical or thermally induced cracking because of the reinforcing and protecting arrangement of ring 20, so as to provide a large mass of metal as a heat sink or reservoir, which entire mass of metal must be heated by heat from braking surface 15 before the temperature of the entire brake drum device is raised into a weakening or dangerous area. As merely illustrative of dimensions of this cast of metal with which satisfactory results have been achieved, it may be noted that a brake drum in accordance herewith having an internal diameter of about 18″ and a lateral extent of 7″ or 8″ for braking surface 15, may comprise a thickness of cast iron of more than an inch at shoulder 26, thus providing a very large mass of metal which must be heated before the temperature of the entire drum and/or steel ring 20 rises to a point where dangerous weakening of the structure results.

In this connection, it is to be understood that, although very large amounts of heat are generated and large forces encountered during braking of a heavy truck, such situations are, usually, intermittent to provide a cooling time between applications of the brakes. Thus, in many if not most situations and particularly where the truck wheel overlies or encloses the brake drum and prevents free circulation of air therearound, such a large mass of cast iron will be able to retain all heat generated in but a momentary brake application and yet remain at a temperature sufficiently low not to imperil strength characteristics when, under comparable circumstances, a thinner section of metal (even a stronger metal such as steel) would be heated by the same amount of heat to a dangerously high temperature. Also, whatever heat is dissipated by such heavy section of cast iron will be greater than that dissipated through an interface between two different ferrous metallic layers.

In addition to the foregoing advantages of a construction of brake drum in accordance herewith, as well as the economic advantages arising from producing substantially the entire brake drum from a relatively inexpensive material such as cast grey iron, the actual manufacture of such a construction in accordance herewith also includes additional advantages of economy and ease of operation. For example, steel ring 20 need merely be stamped or otherwise formed into the desired shape and including the punched hooks 25. The entire remainder of the brake drum structure, including even the flange 11 and mounting face 12, may readily be cast in a single foundry operation in a conventional sand mold. As indicated, for example, in FIG. 6, a portion of such a green sand foundry mold is indicated at 30. Before casting the drum, ring 20 is inserted into the mold cavity, as indicated, and then conventional brake drum molten grey iron is poured into the mold to form the drum 10 as indicated. In this manner, the molten iron flows around hooks 25 and forms integral and smooth junctures with the inside of ring 20 and, particularly, in connection with the edges 21 and 22 thereof, so that, upon solidification of the molten iron in the mold, a truly integral and interlocked structure is provided with tension band 22 of ring 20 encircling and reinforcing the outer circumferential surface of drum 10 adjacent the peripheral open edges thereof, and with edge flange 21 of ring 20 enclosing and interfitting with the open peripheral edge of drum 10 for the protection thereof, while punched hooks 25 (and the hole in ring 20 from which they were punched) are firmly embedded and interlocked in the solidified cast iron.

Thus, there is provided in accordance with this invention for the manufacture of a cast iron brake drum construction of the character described embodying a large heat reservoir mass of cast iron with the outer or heat dissipating surface thereof substantially free or uncovered and with an outer tension reinforcing band for enhanced mechanical strength to resist outward pressure within the drum and with peripheral edge portions which are particularly susceptible to cracking or damage being shielded or protected by the overlying and integrally cast steel ring. In this way increased strength characteristics are achieved without interfering with the heat storing or heat dissipating characteristics of the cast iron, and a large mass of cast iron is provided for the heat-receiving function without interfering with the strength characteristics of the structure, and with edge surface portions thereof being reinforced and protected against weakening or cracking. Yet the entire coacting combination of structural elements and heat accommodating arrangements is readily and economically and simply provided with a simple casting operation in which a stamped steel ring is introduced into the conventional foundry sand mold into which the entire structure is then integrally cast in known manner.

While the forms of apparatus and methods herein described constitute preferred embodiments of the invention, it is to be understood that the invention is not limited to these precise forms of apparatus and methods and that changes may be made therein without departing from the scope of the invention which is defined in the appended claims.

What is claimed is:

1. An automotive truck brake drum of the character described comprising in combination a generally cylindrical cast iron drum portion having a braking surface on the inside thereof, a peripheral reinforcing and protecting tension band around the outside of said drum portion adjacent and overlying a peripheral edge thereof, said band overlying a small portion only of the outer heat dissipating surface of said drum, and means on said band for integrally interlocking said band with the cast iron of said drum portion, said drum portion being relatively massive and of thick cross-section providing a large mass of cast iron as a heat sink for holding a large quantity of friction-engendered heat during braking of said truck and for holding said heat until dissipation thereof for avoiding dangerous or weakening temperature increases of said drum.

2. An automotive truck brake drum of the character described comprising in combination a generally cylindrical cast iron drum portion having a braking surface on the inside thereof, a peripheral reinforcing and protecting tension band around the outside of said drum portion and adjacent a peripheral edge thereof, said band overlying a small portion only of the outer heat dissipating surface of said drum, an annular edge flange on said band overlying the radial surface of said edge of said drum portion for protection thereof against impact forces, and means on said band for integrally interlocking said band with the cast iron of said drum portion, said drum portion being relatively massive and of thick cross-section providing a large mass of cast iron as a heat sink for holding a large quantity of friction-engendered heat during braking of said truck and for holding said heat until dissipation thereof for avoiding dangerous or weakening temperature increases of said drum.

3. An automotive truck brake drum of the character described comprising in combination a generally cylindrical cast iron drum portion having a braking surface on the inside thereof, an annular section at one side of said drum portion and integrally cast therewith for affixing said brake drum to a wheel of a truck, a peripheral steel reinforcing and protecting tension band around the outside of said drum portion and adjacent a peripheral edge thereof, said band overlying a small portion only of the outer heat dissipating surface of said drum, an annular edge flange on said band overlying the radial surface of said edge of said drum portion for protection thereof against impact forces, and said band being at least partially embedded in said cast iron drum portion and integral therewith forming a substantially smooth and uninterrupted outer surface therearound, said drum portion being relatively massive and of thick cross-section providing a large mass of cast iron as a heat sink for holding a large quantity of friction-engendered heat during braking of said truck and for holding said heat until dissipation thereof for avoiding dangerous or weakening temperature increases of said drum.

4. An automotive truck brake drum of the character described comprising in combination a generally cylindrical cast iron drum portion having a braking surface on the inside thereof, a peripheral reinforcing and protecting tension band around the outside of said drum portion and adjacent a peripheral edge thereof, said band overlying a small portion only of the outer heat dissipating surface of said drum, an annular edge flange on said band overlying substantially the entire radial surface of said edge of said drum portion for protection thereof against impact forces, hook means on said band for integrally interlocking said band with the cast iron of said drum portion, and said band being at least partially embedded in said cast iron drum portion forming a substantially smooth and uninterrupted outer surface therearound, said drum portion being relatively massive and of thick cross-section providing a large mass of cast iron as a heat sink for holding a large quantity of friction-engendered heat during braking of said truck and for holding said heat until dissipation thereof for avoiding dangerous or weakening temperature increases of said drum.

5. An automotive truck brake drum of the character described comprising in combination a generally cylindrical cast iron drum portion having a cylindrical braking surface on the inside thereof, an annular section at one side of said drum portion and integrally cast therewith for affixing said brake drum to a wheel of a truck, a peripheral steel reinforcing and protecting tension band around the outside of said drum portion and adjacent a peripheral edge thereof, said band overlying a small portion only of the outer heat dissipating surface of said drum, an annular edge flange on said band overlying substantially the entire radial surface of said edge of said drum portion for protection thereof against impact forces, and a plurality of hook means on said band for integrally interlocking said band with the cast iron of said drum portion, said drum portion being relatively massive and of thick cross-section providing a large mass of cast iron as a heat sink for holding a large quantity of friction-engendered heat during braking of said truck and for holding said heat until dissipation thereof for avoiding dangerous or weakening temperature increases of said drum.

References Cited in the file of this patent

UNITED STATES PATENTS

| | | |
|---|---|---|
| 1,509,292 | Hansen et al. | Sept. 23, 1924 |
| 1,576,317 | Eklind | Mar. 9, 1926 |
| 1,686,346 | Sanford | Oct. 2, 1928 |
| 1,946,102 | Norton | Feb. 6, 1934 |
| 1,955,156 | Udale | Apr. 17, 1934 |
| 2,088,191 | Eksergian | July 27, 1937 |
| 2,136,447 | Le Jeune | Nov. 15, 1938 |
| 2,181,008 | Bonzack | Nov. 21, 1939 |
| 2,274,503 | Reid | Feb. 24, 1942 |
| 2,844,229 | Whitfield | July 22, 1958 |